US009003005B2

(12) United States Patent
Komine et al.

(10) Patent No.: US 9,003,005 B2
(45) Date of Patent: Apr. 7, 2015

(54) MONITORING APPARATUS, MONITORING SYSTEM, AND INFORMATION SETTING METHOD

(75) Inventors: Hiroaki Komine, Yamato (JP); Katsuyoshi Tsuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 13/414,019

(22) Filed: Mar. 7, 2012

(65) Prior Publication Data

US 2012/0239803 A1 Sep. 20, 2012

(30) Foreign Application Priority Data

Mar. 17, 2011 (JP) ................... 2011-058933

(51) Int. Cl.
*G06F 15/173* (2006.01)
*H04L 12/26* (2006.01)
(52) U.S. Cl.
CPC ...................... *H04L 43/12* (2013.01)
(58) Field of Classification Search
CPC . H04L 43/00; H04L 43/0817; H04L 43/0888; H04L 43/10; H04L 43/12; H04L 67/16; H04L 67/22; H04L 67/101; H04L 67/1102; H04L 677/1008; H04L 12/2602; H04L 29/12113; H04L 61/1541; H04L 69/329
USPC .................. 709/223, 224, 214, 238
See application file for complete search history.

(56) References Cited

U.S. PATENT DOCUMENTS 8,683,075 B1 * 3/2014 Joffe et al. ............ 709/238
2010/0023612 A1 * 1/2010 Yoshida et al. ............ 709/223

FOREIGN PATENT DOCUMENTS

| JP | 2003-051822 | 2/2003 |
| JP | 2003-256303 | 9/2003 |
| JP | 2006-013625 | 1/2006 |
| JP | 2010-157959 | 7/2010 |

OTHER PUBLICATIONS

Japanese Office Action dated Jul. 15, 2014 in corresponding Japanese Patent Application No. 2011-058933.

* cited by examiner

*Primary Examiner* — Kyung H Shin
(74) *Attorney, Agent, or Firm* — Staas & Halsey LLP

(57) ABSTRACT

A monitoring apparatus includes a storage and a processor. The storage stores collecting apparatus information for identifying one of a plurality of collecting apparatuses collecting status information of a network. The processor acquires status information of the network from a network apparatus connected to the network. The processor acquires, from a database, collecting apparatus information for identifying each of the plurality of collecting apparatuses. The processor acquires, based on the acquired collecting apparatus information, load information indicating a load on each of the plurality of collecting apparatuses. The processor selects, based on the acquired load information, one collecting apparatus among the plurality of collecting apparatuses, to which the monitoring apparatus transmits the acquired status information. The processor stores collecting apparatus information for identifying the selected collecting apparatus in the storage. The processor notifies the selected collecting apparatus of monitoring apparatus information for identifying the monitoring apparatus.

8 Claims, 15 Drawing Sheets

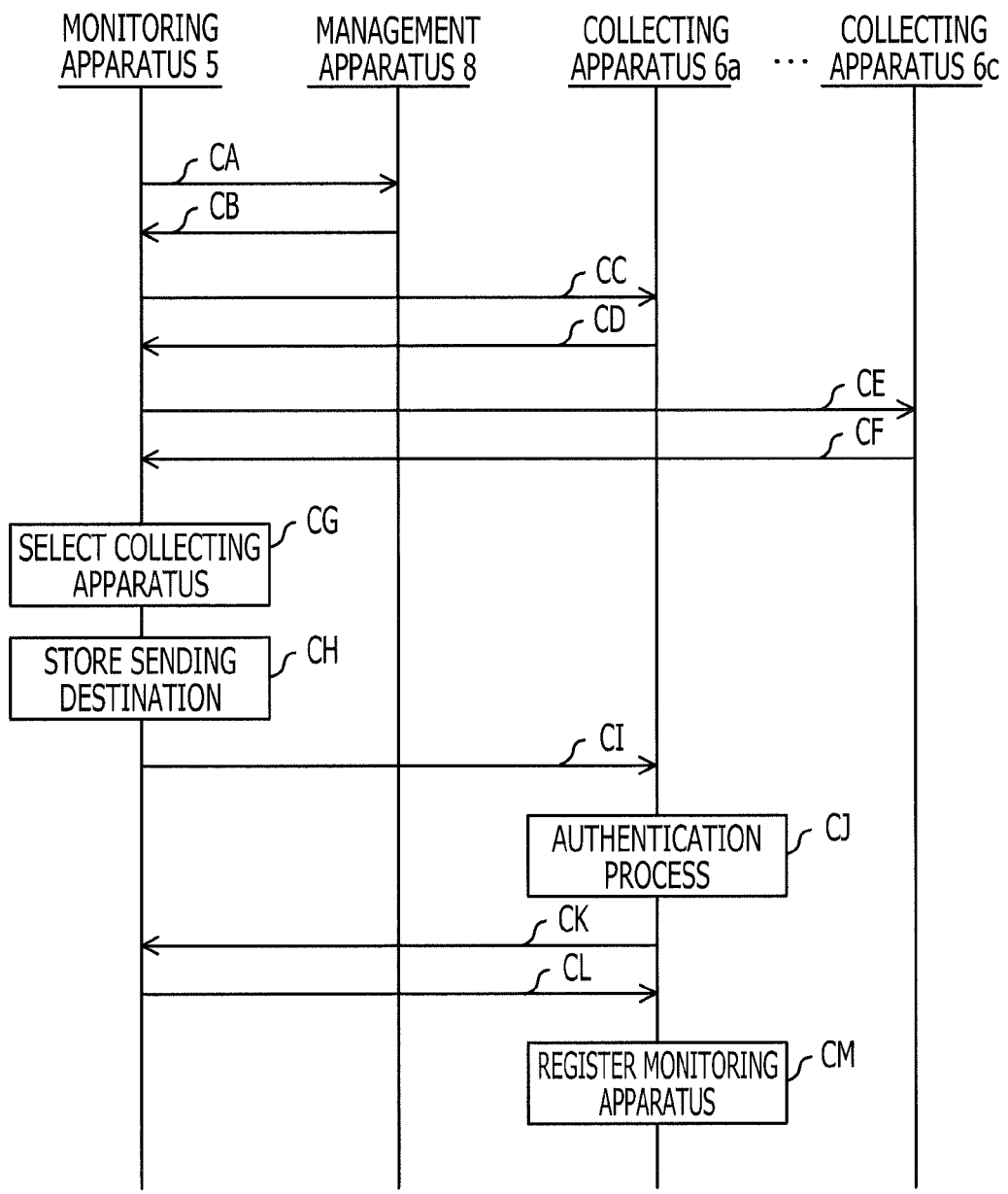

MONITORING APPARATUS, MONITORING SYSTEM, AND INFORMATION SETTING METHOD

CROSS-REFERENCE TO RELATED APPLICATION(S)

This application is based upon and claims the benefit of priority of the prior Japanese Patent Application No. 2011-058933, filed on Mar. 17, 2011, the entire contents of which are incorporated herein by reference.

FIELD

The embodiments discussed herein are related to monitoring systems for monitoring a status of a network.

BACKGROUND

Monitoring systems that collect status information of a network from a plurality of network apparatuses forming the network and that analyze the collected information are known. In the monitoring systems, monitoring apparatuses called network probes are installed for individual network apparatuses so as to obtain network information from the individual network apparatuses. For example, the monitoring apparatuses obtain, from the network apparatuses, status information regarding the transfer time and the packet loss status of a communication channel. The status information obtained by the monitoring apparatuses is collected by server apparatuses that function as collecting apparatuses.

The following technique is known. A server list management unit of a management server in a load distributed system selects servers to be accessed by a client terminal management server with reference to operation statuses and load statuses of servers, generates a list of the selected servers, and sends the generated server list to the client terminal management server.

Japanese Laid-open Patent Publication No. 2003-256303 discloses a related technique.

In the work for installing a monitoring apparatus, which has been hitherto performed, a location where the monitoring apparatus is to be installed and address information of the monitoring apparatus are designed beforehand. At the time of installation of the monitoring apparatus, address information of a collecting apparatus that has been determined as a sending destination of status information is set in the newly installed monitoring apparatus and the address information of the newly installed monitoring apparatus is also set in the collecting apparatus. Subsequently, a connection between the monitoring apparatus installed at the location and the collecting apparatus located at the center is checked. Accordingly, man-hours are spent on the pre-design process, the address-information setting process, and the connection check process.

SUMMARY

According to an aspect of the present invention, provided is a monitoring apparatus including a storage and a processor. The storage stores collecting apparatus information for identifying one of a plurality of collecting apparatuses collecting status information of a network. The processor acquires status information of the network from a network apparatus connected to the network. The processor acquires, from a database, collecting apparatus information for identifying each of the plurality of collecting apparatuses. The processor acquires, based on the acquired collecting apparatus information, load information indicating a load on each of the plurality of collecting apparatuses. The processor selects, based on the acquired load information, one collecting apparatus among the plurality of collecting apparatuses, to which the monitoring apparatus transmits the acquired status information. The processor stores collecting apparatus information for identifying the selected collecting apparatus in the storage. The processor notifies the selected collecting apparatus of monitoring apparatus information for identifying the monitoring apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram illustrating a third example of a process of installing a monitoring apparatus.

DESCRIPTION OF EMBODIMENTS

Figure 1:
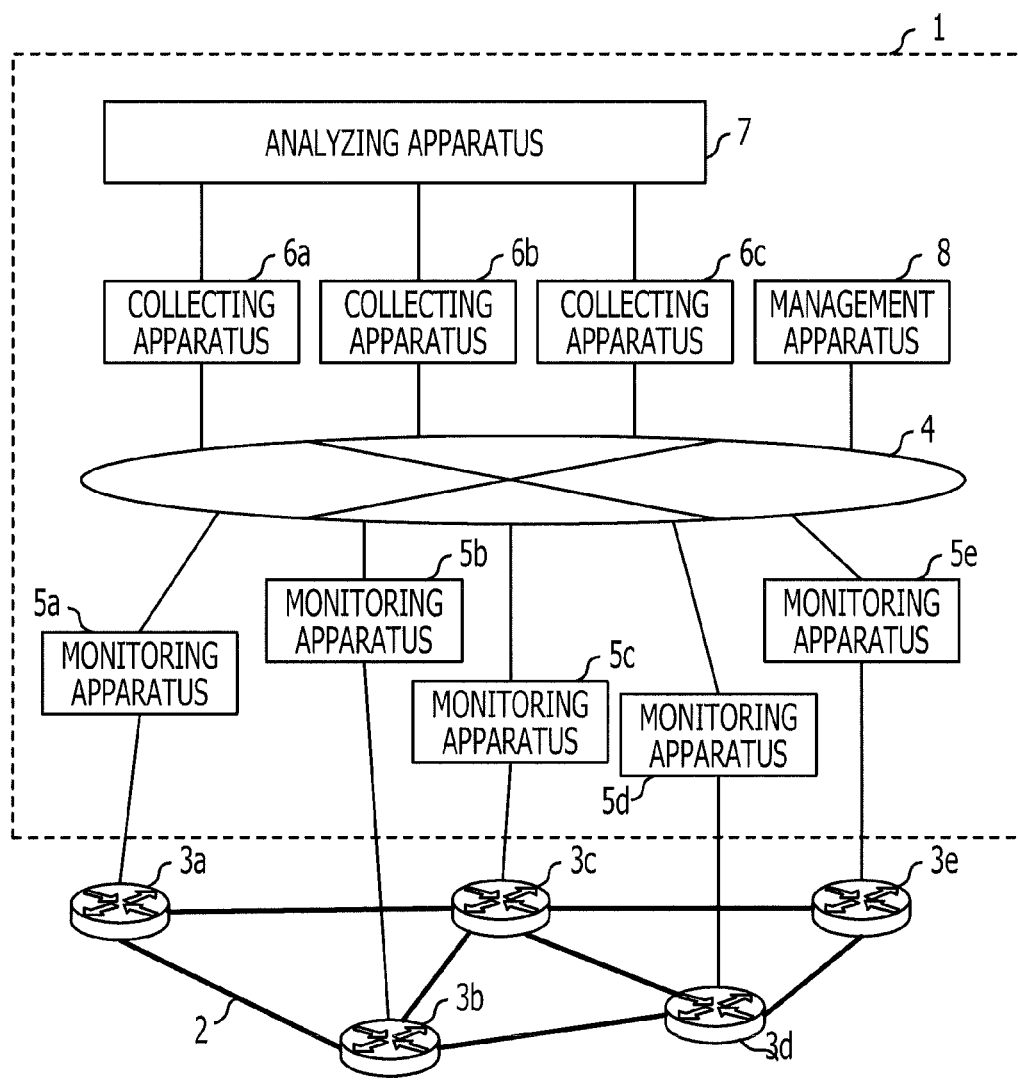
FIG. 1 is a diagram illustrating an example of an overall configuration of a monitoring system.

Embodiments will be described below with reference to the attached drawings. FIG. 1 is a diagram illustrating an example of an overall configuration of a monitoring system. A monitoring system 1 monitors the quality of a communication network 2, a failure caused in the communication network 2, and so forth by collecting status information of the communication network 2 that is held by network apparatuses 3a to 3e connected to the communication network 2 and by analyzing the collected status information. The monitoring system 1 includes a maintenance network 4, monitoring apparatuses 5a to 5e, collecting apparatuses 6a to 6c, an analyzing apparatus 7, and a management apparatus 8.

In the description given below, the network apparatuses 3*a* to 3*e* may be collectively referred to as "network apparatuses 3" and an arbitrary network apparatus may be referred to as a "network apparatus 3". In addition, the monitoring apparatuses 5*a* to 5*e* may be collectively referred to as "monitoring apparatuses 5" and an arbitrary monitoring apparatus may be referred to as a "monitoring apparatus 5". Also, the collecting apparatuses 6*a* to 6*c* may be collectively referred to as "collecting apparatuses 6" and an arbitrary collecting apparatus may be referred to as a "collecting apparatus 6".

The monitoring apparatuses 5, the collecting apparatuses 6, and the management apparatus 8 are connected to the maintenance network 4 and are capable of performing communication via the maintenance network 4. Also, the collecting apparatuses 6 are connected to the analyzing apparatus 7 via communication lines and are capable of performing communication with the analyzing apparatus 7. In other embodiments, the analyzing apparatus 7 may also be connected to the maintenance network 4 and perform communication via the maintenance network 4.

The monitoring apparatuses 5 obtain the status information of the communication network 2 from the network apparatuses 3. The status information may be information regarding the transfer time and the packet loss status of the communication network 2, for example. The monitoring apparatuses 5 may be, for example, network probes. The monitoring apparatuses 5 send the obtained status information to the collecting apparatuses 6. The collecting apparatuses 6 send the status information collected from the monitoring apparatuses 5 to the analyzing apparatus 7. The collecting apparatuses 6 may be, for example, collecting server apparatuses that collect status information obtained by network probes. The analyzing apparatus 7 processes the status information collected by the collecting apparatuses 6, thereby analyzing the status of the communication network 2 and detecting a failure caused in the communication network 2. The analyzing apparatus 7 may be, for example, a data aggregation server apparatus.

The management apparatus 8 includes a collecting apparatus database, which stores information on the collecting apparatuses 6 that collect the status information in the monitoring system 1. The management apparatus 8 notifies the monitoring apparatuses 5 of the information on the collecting apparatuses 6 that is stored in the collecting apparatus database in response to a request sent from the monitoring apparatuses 5. The information on the collecting apparatuses 6 may be identification information of the collecting apparatuses 6 for uniquely specifying a sending destination to which the status information is sent from the monitoring apparatuses 5. Such identification information may be, for example, address information used in the maintenance network 4. In the description given below, the identification information of each collecting apparatus 6 may be referred to as "collecting apparatus information". The collecting apparatus database will be described later.

Figure 2:
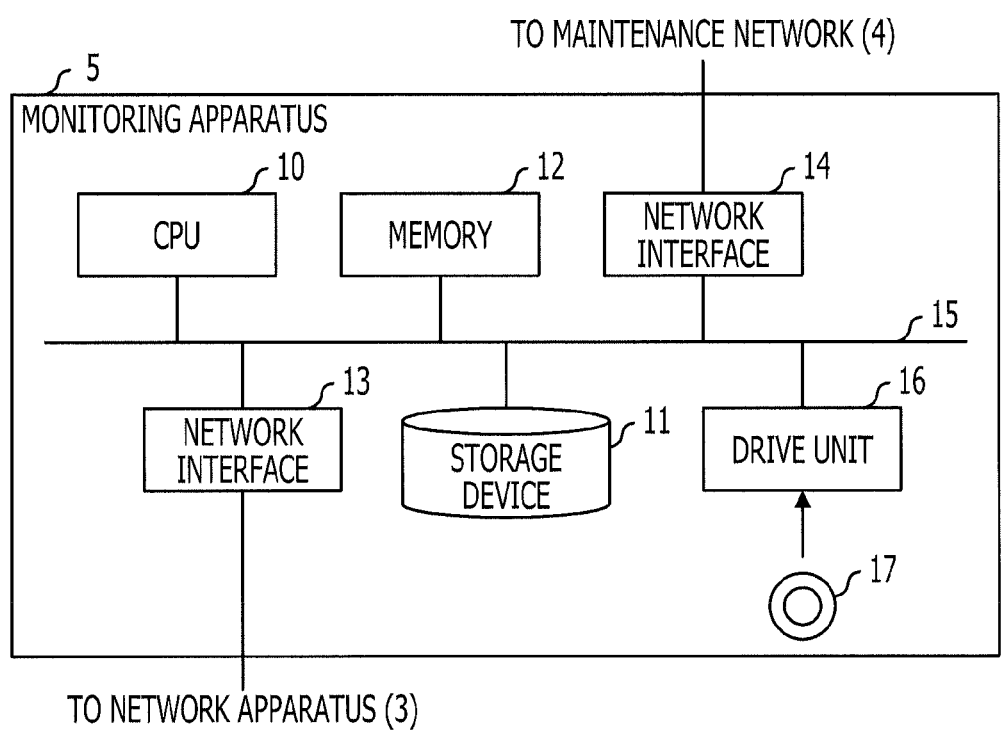
FIG. 2 is a diagram illustrating an example of a hardware configuration of a monitoring apparatus.

Now, hardware configurations of the monitoring apparatuses 5, the collecting apparatuses 6, the analyzing apparatus 7, and the management apparatus 8 will be described. FIG. 2 is a diagram illustrating an example of a hardware configuration of the monitoring apparatus 5. The hardware configuration illustrated in FIG. 2 is merely an example of the hardware configuration for realizing the monitoring apparatus 5. Other configurations may be adopted as long as the other configurations execute processes of the monitoring apparatus 5 described herein. The monitoring apparatus 5 includes a central processing unit (CPU) 10, a storage device 11, a memory 12, network interfaces 13 and 14, a drive unit 16, and a data bus 15.

The CPU 10 executes a program stored in the storage device 11, thereby performing various processes for controlling operations of the monitoring apparatus 5 and processes for realizing functions of the monitoring apparatus 5 for collecting the status information in the monitoring system 1. The CPU 10 also executes a program stored in the storage device 11, thereby performing the following process for setting information in the monitoring apparatus 5 and the collecting apparatus 6 when a new monitoring apparatus 5 is installed.

The storage device 11 may include a storage unit, such as a nonvolatile memory or a hard disk (HD). The storage device 11 stores the programs causing the CPU 10 to execute the aforementioned processes. The storage device 11 also stores a collecting apparatus storage database. The collecting apparatus storage database stores identification information of the collecting apparatus 6 that has been selected as a sending destination to which the status information is sent from the monitoring apparatus 5 and a collecting apparatus storage table which stores collecting apparatus information of the collecting apparatuses 6 included in the monitoring system 1. The collecting apparatus storage database will be described later.

The memory 12 stores a program that is being executed by the CPU 10 and data that is temporarily used in the execution of this program. The memory 12 may include a read only memory (ROM) and a random access memory (RAM). The network interface 13 performs a process of sending and receiving signals between the monitoring apparatus 5 and the network apparatus 3. The network interface 14 performs a process of sending and receiving signals via the maintenance network 4. The drive unit 16 reads data from and/or writes data to a computer-readable medium 17. The programs may be stored, when delivered, in the computer-readable medium 17 such as a compact disc (CD), CD-ROM, CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. The programs is installed onto the storage device 11 from the computer-readable medium 17, and loaded into the memory 12 from the storage device 11 when executed by the CPU 10. The CPU 10, the storage device 11, the memory 12, the network interfaces 13 and 14, and the drive unit 16 are electrically connected to each other via the data bus 15.

Figure 3:
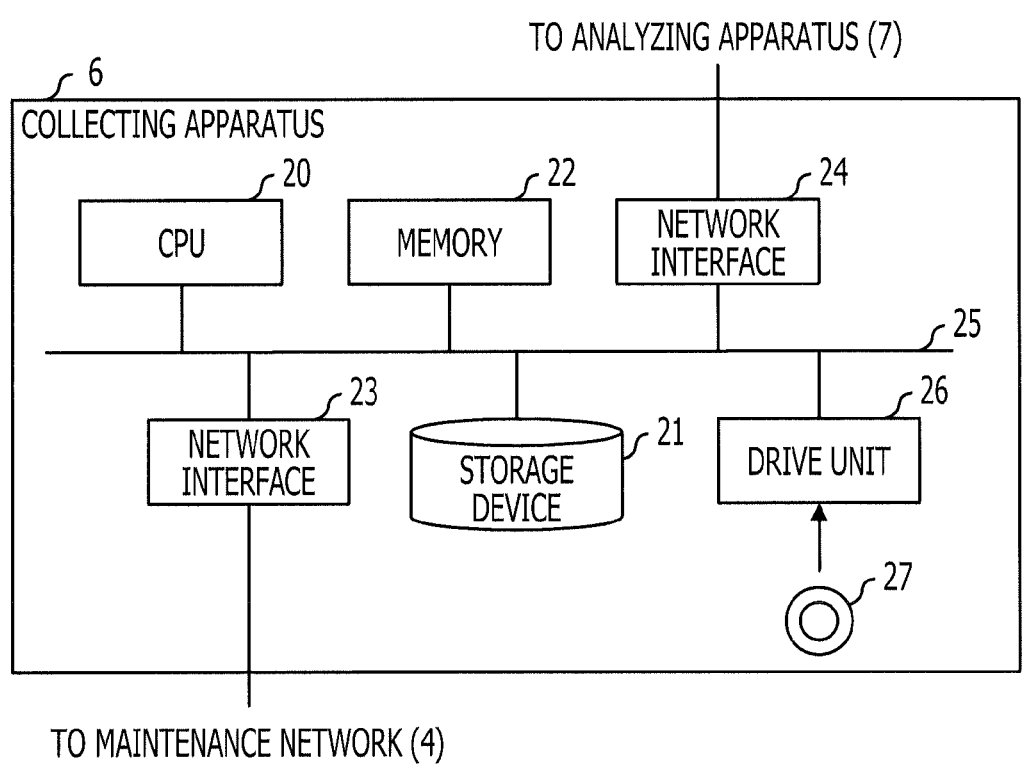
FIG. 3 is a diagram illustrating an example of a hardware configuration of a collecting apparatus.

FIG. 3 is a diagram illustrating an example of a hardware configuration of the collecting apparatus 6. The hardware configuration illustrated in FIG. 3 is merely an example of the hardware configuration for realizing the collecting apparatus 6. Other configurations may be adopted as long as the other configurations execute the processes of the collecting apparatus 6 described herein. The collecting apparatus 6 includes a CPU 20, a storage device 21, a memory 22, network interfaces 23 and 24, a drive unit 26, and a data bus 25.

The CPU 20 executes a program stored in the storage device 21, thereby performing various processes for controlling operations of the collecting apparatus 6 and processes for realizing functions of the collecting apparatus 6 for collecting the status information in the monitoring system 1. The CPU 20 also executes a program stored in the storage device 21, thereby performing the following process for setting information in the monitoring apparatus 5 and the collecting apparatus 6 when the new monitoring apparatus 5 is installed.

The storage device 21 may include a storage unit, such as a nonvolatile memory or a hard disk. The storage device 21 stores the programs causing the CPU 20 to execute the aforementioned processes. The storage device 21 also stores a monitoring apparatus database, which stores identification information of the monitoring apparatuses 5 accommodated by the collecting apparatus 6, i.e., the monitoring apparatuses 5 each serving as a sending source from which the collecting apparatus 6 collects the status information. In the description given below, the identification information of each monitoring apparatus 5 may be referred to as "monitoring apparatus information".

The monitoring apparatus information may be identification information for uniquely specifying the monitoring apparatus 5 serving as a sending destination to which the collecting apparatus 6 that has accommodated this monitoring apparatus 5 is to send various instruction signals. Such identification information may be, for example, address information used in the maintenance network 4. The monitoring apparatus database will be described later.

The memory 22 stores a program that is being executed by the CPU 20 and data temporarily used in the execution of this program. The memory 22 may include a ROM and a RAM. The network interface 23 performs a process of sending and receiving signals via the maintenance network 4. The network interface 24 performs a process of sending and receiving signals between this collecting apparatus 6 and the analyzing apparatus 7. The drive unit 26 reads data from and/or writes data to a computer-readable medium 27. The CPU 20, the storage device 21, the memory 22, the network interfaces 23 and 24, and the drive unit 26 are electrically connected to each other via the data bus 25.

Figure 4:
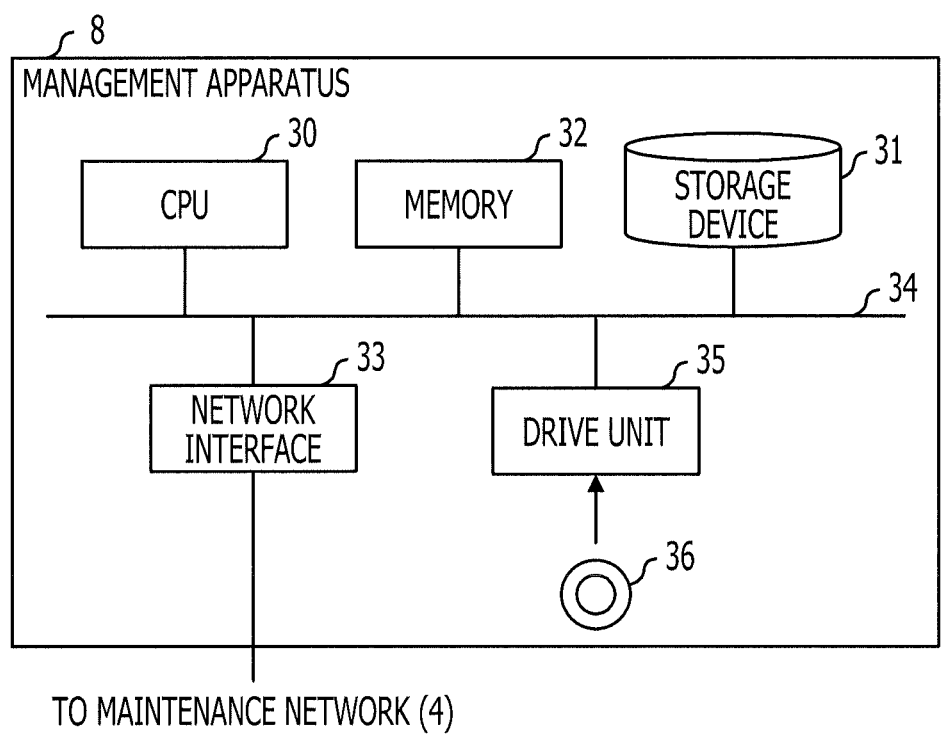
FIG. 4 is a diagram illustrating an example of a hardware configuration of a management apparatus.

FIG. 4 is a diagram illustrating an example of a hardware configuration of the management apparatus 8. The hardware configuration illustrated in FIG. 4 is merely an example of the hardware configuration for realizing the management apparatus 8. Other configurations may be adopted as long as the other configurations execute processes of the management apparatus 8 described herein. The management apparatus 8 includes a CPU 30, a storage device 31, a memory 32, a network interface 33, a drive unit 35, and a data bus 34.

The CPU 30 executes a program stored in the storage device 31, thereby performing various processes for controlling operations of the management apparatus 8 and the following process for setting the monitoring apparatus 5 and the collecting apparatus 6 when the new monitoring apparatus 5 is installed.

The storage device 31 may include a storage unit, such as a nonvolatile memory or a hard disk. The storage device 31 stores the programs causing the CPU 30 to execute the aforementioned processes. The storage device 31 also stores the collecting apparatus database.

The memory 32 stores a program that is being executed by the CPU 30 and data temporarily used in the execution of this program. The memory 32 may include a ROM and a RAM. The network interface 33 performs a process of sending and receiving signals via the maintenance network 4. The drive unit 35 reads data from and/or writes data to a computer-readable medium 36. The CPU 30, the storage device 31, the memory 32, the network interface 33, and the drive unit 35 are electrically connected to each other via the data bus 34.

Figure 5:
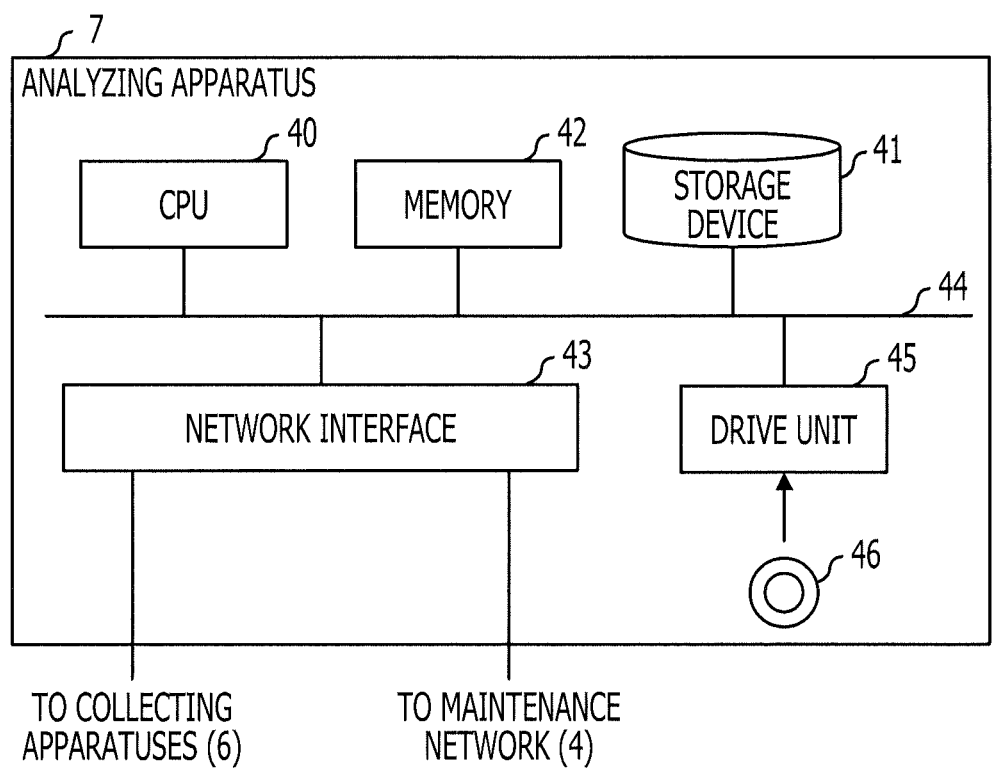
FIG. 5 is a diagram illustrating an example of a hardware configuration of an analyzing apparatus.

FIG. 5 is a diagram illustrating an example of a hardware configuration of the analyzing apparatus 7. The hardware configuration illustrated in FIG. 5 is merely an example of the hardware configuration for realizing the analyzing apparatus 7. Other configurations may be adopted as long as the other configurations execute processes of the analyzing apparatus 7 described herein. The analyzing apparatus 7 includes a CPU 40, a storage device 41, a memory 42, a network interface 43, a drive unit 45, and a data bus 44.

The CPU 40 executes a program stored in the storage device 41, thereby performing various processes for controlling operations of the analyzing apparatus 7 and processes for realizing functions of the analyzing apparatus 7 for collecting the status information in the monitoring system 1. The CPU 40 also executes a program stored in the storage device 41, thereby performing processes of the analyzing apparatus 7 to be described below.

The storage device 41 may include a storage unit, such as a nonvolatile memory or a hard disk. The storage device 41 stores the programs causing the CPU 40 to execute the aforementioned processes.

The memory 42 stores a program that is being executed by the CPU 40 and data temporarily used in the execution of this program. The memory 42 may include a ROM and a RAM. The network interface 43 performs a process of sending and receiving signals between the collecting apparatuses 6 and the analyzing apparatus 7. The network interface 43 may also perform a process of sending and receiving signals via the maintenance network 4. The drive unit 45 reads data from and/or writes data to a computer-readable medium 46. The CPU 40, the storage device 41, the memory 42, the network interface 43, and the drive unit 45 are electrically connected to each other via the data bus 44.

Figure 6:
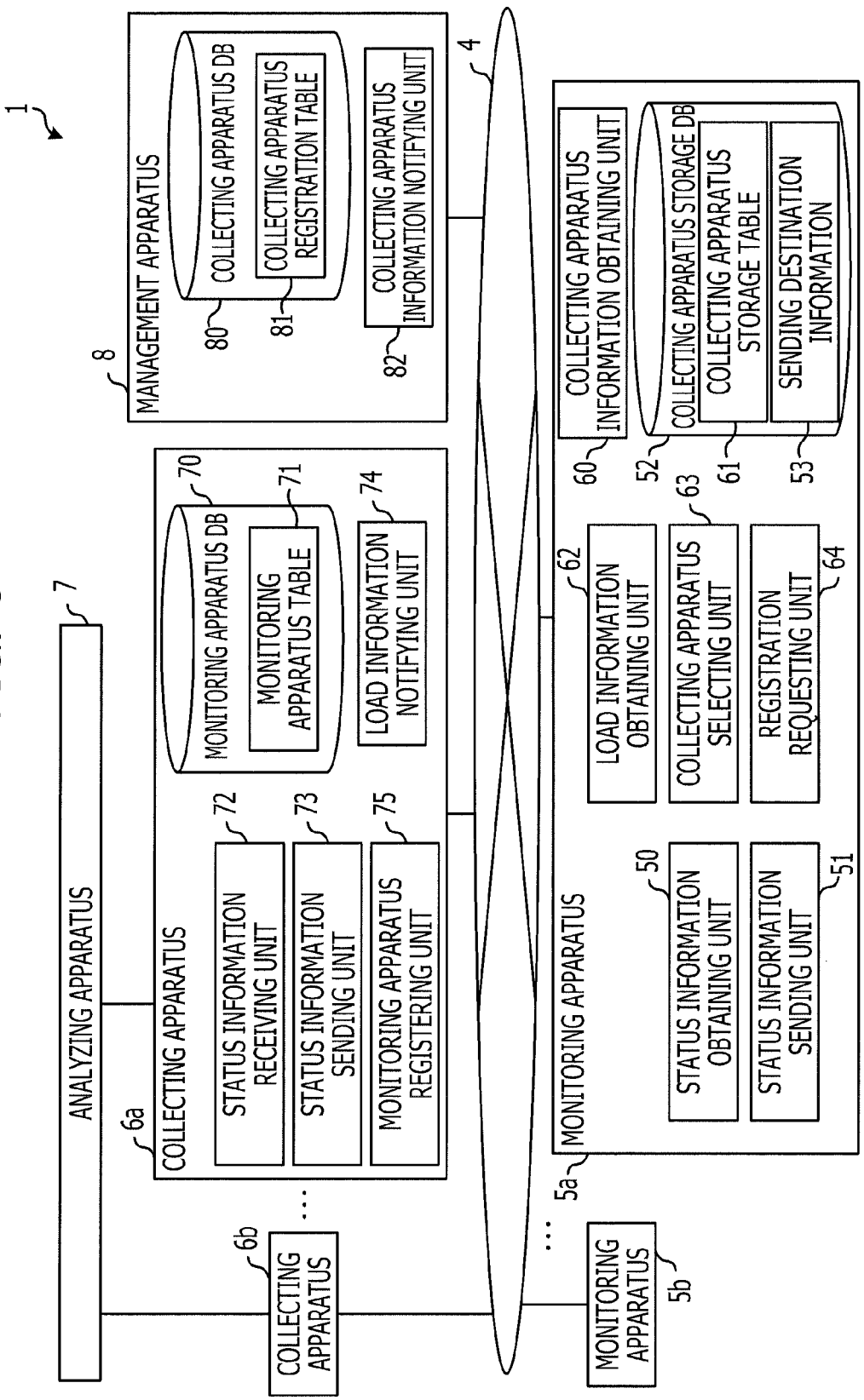
FIG. 6 is a diagram illustrating a first exemplary configuration of a monitoring system.

Now, exemplary configurations of the monitoring system 1 realized with the above-described hardware configurations will be described. FIG. 6 is a diagram illustrating a first exemplary configuration of the monitoring system 1. The CPU 10 of the monitoring apparatus 5 illustrated in FIG. 2 operates in cooperation with the other hardware components of the monitoring apparatus 5 as needed, in accordance with the programs stored in the storage device 11, thereby performing information processing realized by functional components of the monitoring apparatus 5 illustrated in FIG. 6. Similarly, the CPU 20 of the collecting apparatus 6 illustrated in FIG. 3 operates in cooperation with the other hardware components of the collecting apparatus 6 as needed, in accordance with the programs stored in the storage device 21, thereby performing information processing realized by functional components of the collecting apparatus 6 illustrated in FIG. 6. Additionally, the CPU 30 of the management apparatus 8 illustrated in FIG. 4 operates in cooperation with the other hardware components of the management apparatus 8 as needed, in accordance with the programs stored in the storage device 31, thereby performing information processing realized by functional components of the management apparatus 8 illustrated in FIG. 6. The same applies to other embodiments.

FIG. 6 mainly illustrates functions related to the following description. Accordingly, the monitoring apparatuses 5, the collecting apparatuses 6, the analyzing apparatus 7, and the management apparatus 8 of the monitoring system 1 may include functional components other than those illustrated in FIG. 6.

The monitoring apparatus 5 includes a status information obtaining unit 50, a status information sending unit 51, a collecting apparatus storage database 52, a collecting apparatus information obtaining unit 60, a load information obtaining unit 62, a collecting apparatus selecting unit 63, and a registration requesting unit 64. In the attached drawings, the database is abbreviated as "DB".

The collecting apparatus 6 includes a monitoring apparatus database 70, a status information receiving unit 72, a status information sending unit 73, a load information notifying unit 74, and a monitoring apparatus registering unit 75. The management apparatus 8 includes a collecting apparatus database 80 and a collecting apparatus information notifying unit 82. Hereinafter, the individual functional components included in the monitoring apparatus 5, the collecting apparatus 6, and the management apparatus 8 will be described.

Monitoring Apparatus 5

The status information obtaining unit 50 obtains status information of the communication network 2 from the network apparatus 3. The status information sending unit 51 sends the obtained status information to the collecting apparatus 6 that is specified with sending destination information 53 stored in the collecting apparatus storage database 52. The sending destination information 53 may be the collecting apparatus information of the collecting apparatus 6 that serves as a sending destination.

Figure 7:
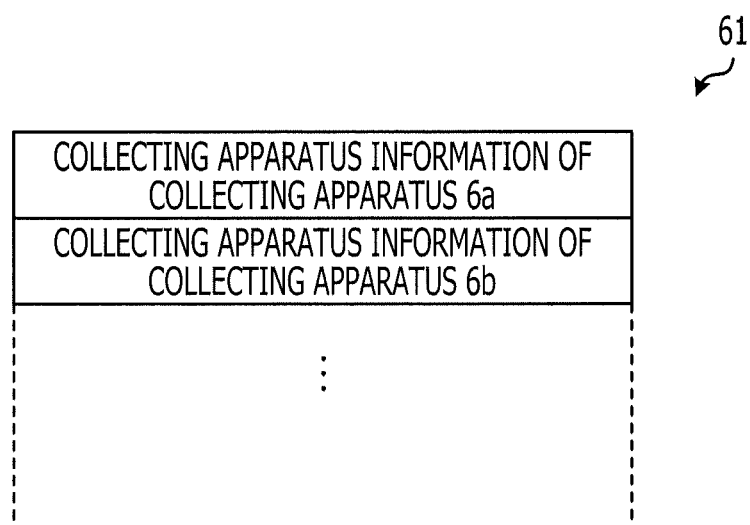
FIG. 7 is a diagram illustrating an example of a collecting apparatus storage table.

The collecting apparatus storage database 52 stores a collecting apparatus storage table 61 which stores information on the collecting apparatuses 6 that collect status information in the monitoring system 1. As described above, the collecting apparatus storage database 52 may be stored in the storage device 11 of the monitoring apparatus 5 illustrated in FIG. 2. FIG. 7 is a diagram illustrating an example of the collecting apparatus storage table 61. For example, the collecting apparatus storage table 61 may store a list of pieces of collecting apparatus information of all or some of the collecting apparatuses 6 that collect status information in the monitoring system 1.

Referring back to FIG. 6, the collecting apparatus information obtaining unit 60 obtains, from the management apparatus 8, the collecting apparatus information of all or some of the collecting apparatuses 6 included in the monitoring system 1. At this time, the collecting apparatus information obtaining unit 60 sends, to the management apparatus 8, a collecting apparatus information request signal for requesting for the collecting apparatus information. Identification information or address information of the management apparatus 8, which is used for sending the collecting apparatus information request signal, may be input by an operator of the monitoring apparatus 5 or may be stored in the storage device 11 beforehand.

The collecting apparatus information obtaining unit 60 receives the collecting apparatus information sent from the management apparatus 8 in response to the collecting apparatus information request signal, and stores the received collecting apparatus information in the collecting apparatus storage table 61. For example, the collecting apparatus information obtaining unit 60 may perform the process of obtaining the collecting apparatus information in response to an operation of the operator of the monitoring apparatus 5, or may automatically perform the process of obtaining the collecting apparatus information once the monitoring apparatus 5 is connected to the maintenance network 4.

The load information obtaining unit 62 obtains, from each of the collecting apparatuses 6 whose collecting apparatus information is stored in the collecting apparatus storage table 61, load information that indicates the processing load of the collecting apparatus 6. The load information may be, for example, the number of monitoring apparatuses 5 accommodated by the collecting apparatus 6, i.e., the number of accommodated monitoring apparatuses 5. Other indices may be used as the load information. For example, the load information may be an average usage ratio of the CPU 20 of the collecting apparatus 6 or an average amount of traffic on the network interface 23 or 24.

When obtaining the load information, the load information obtaining unit 62 sends a load information request signal for requesting for the load information, to each of the collecting apparatuses 6. The load information obtaining unit 62 receives load information sent from each of the collecting apparatuses 6 in response to the load information request signal. The load information obtaining unit 62 outputs the received load information to the collecting apparatus selecting unit 63.

The collecting apparatus selecting unit 63 selects a collecting apparatus 6 that will serve as the sending destination of the status information on the basis of the load information. For example, the collecting apparatus selecting unit 63 may select the collecting apparatus 6 that will serve as the sending destination in accordance with a selection rule for preferentially selecting the collecting apparatus 6 having less load. The collecting apparatus selecting unit 63 may determine that the load of a collecting apparatus 6 that has accommodated a smaller number of monitoring apparatuses 5 is less. For example, the collecting apparatus selecting unit 63 may select a collecting apparatus 6 that has accommodated the smallest number of monitoring apparatuses 5, as the collecting apparatus 6 that will serve as the sending destination. The collecting apparatus selecting unit 63 stores identification information of the selected collecting apparatus 6, as the sending destination information 53, in the collecting apparatus storage database 52.

The registration requesting unit 64 sends, to the collecting apparatus 6 selected by the collecting apparatus selecting unit 63, a registration request signal for requesting the collecting apparatus 6 to register this monitoring apparatus 5 as the monitoring apparatus accommodated by the collecting apparatus 6. The registration request signal may include the monitoring apparatus information of the monitoring apparatus 5. Thus, the registration requesting unit 64 notifies the collecting apparatus 6 selected by the collecting apparatus selecting unit 63 of the monitoring apparatus information.

Collecting Apparatus 6

Figure 8:
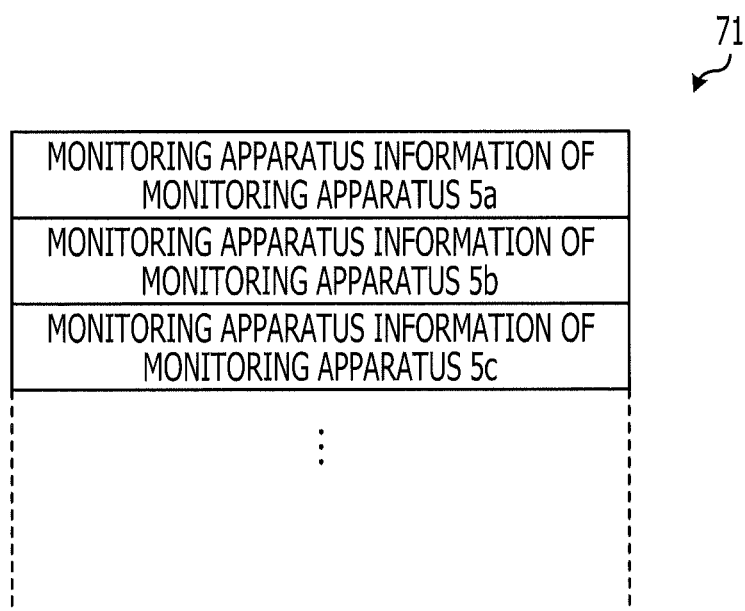
FIG. 8 is a diagram illustrating an example of a monitoring apparatus table.

The monitoring apparatus database 70 stores a monitoring apparatus table 71 which stores information on the monitoring apparatuses 5 accommodated by the collecting apparatus 6. As described above, the monitoring apparatus database 70 may be stored in the storage device 21 of the collecting apparatus 6 illustrated in FIG. 3. FIG. 8 is a diagram illustrating an example of the monitoring apparatus table 71. For example, the monitoring apparatus table 71 may store a list of pieces of monitoring apparatus information of the monitoring apparatuses 5 accommodated by this collecting apparatus 6.

Referring back to FIG. 6, the status information receiving unit 72 receives status information sent from the monitoring apparatus 5. For example, the status information receiving unit 72 may send an instruction for requesting for status information to the monitoring apparatus 5 whose monitoring apparatus information is stored in the monitoring apparatus table 71 and which is accommodated by this collecting apparatus 6, so as to collect status information from the monitoring apparatus 5. The status information sending unit 73 sends the status information received from the monitoring apparatus 5 to the analyzing apparatus 7.

The load information notifying unit 74 receives the load information request signal sent from the load information obtaining unit 62 of the monitoring apparatus 5. Upon reception of the load information request signal, the load information notifying unit 74 sends, to the monitoring apparatus 5, load information that indicates the processing load of the collecting apparatus 6. For example, the load information notifying unit 74 may determine the number of monitoring apparatuses 5 whose monitoring apparatus information is stored in the monitoring apparatus table 71 and which are accommodated by the collecting apparatus 6, and generate load information that indicates the number of the accommodated monitoring apparatuses 5.

The monitoring apparatus registering unit 75 receives the registration request signal sent from the registration requesting unit 64 of the monitoring apparatus 5. Upon reception of the registration request signal, the monitoring apparatus registering unit 75 registers the monitoring apparatus 5 that has sent the registration request signal in the monitoring apparatus database 70, as a monitoring apparatus 5 accommodated by this collecting apparatus 6. That is, the monitoring apparatus registering unit 75 stores the monitoring apparatus information of the monitoring apparatus 5 that has sent the registration request signal in the monitoring apparatus table 71.

Management Apparatus 8

Figure 9:
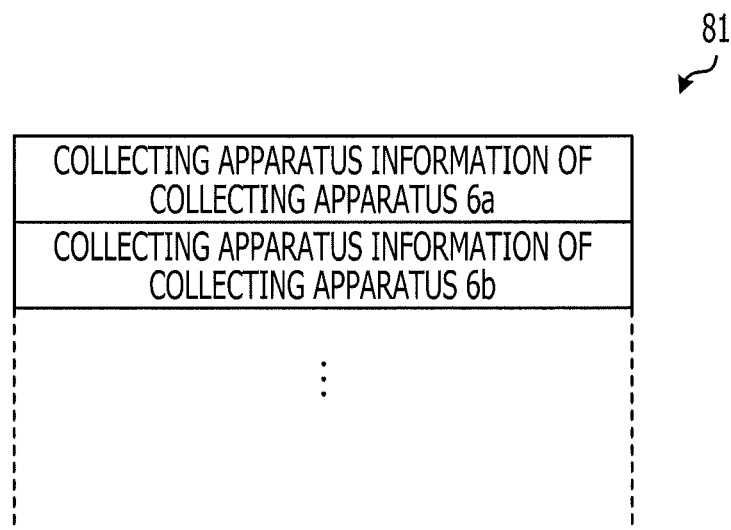
FIG. 9 is a diagram illustrating an example of a collecting apparatus registration table.

The collecting apparatus database 80 stores a collecting apparatus registration table 81 which stores information on the collecting apparatuses 6 that collect status information in the monitoring system 1. As described above, the collecting apparatus database 80 may be stored in the storage device 31 of the management apparatus 8 illustrated in FIG. 4. FIG. 9 is a diagram illustrating an example of the collecting apparatus registration table 81. For example, the collecting apparatus registration table 81 may store a list of pieces of collecting apparatus information of all or some of the collecting apparatuses 6 that collect status information in the monitoring system 1. The collecting apparatus database 80 is accessible from the monitoring apparatus 5.

Referring back to FIG. 6, the collecting apparatus information notifying unit 82 receives the collecting apparatus information request signal sent from the collecting apparatus information obtaining unit 60 of the monitoring apparatus 5. Upon reception of the collecting apparatus information request signal, the collecting apparatus information notifying unit 82 sends, to the monitoring apparatus 5, the collecting apparatus information of all or some of the collecting apparatuses 6 that is stored in the collecting apparatus registration table 81.

Figure 10:
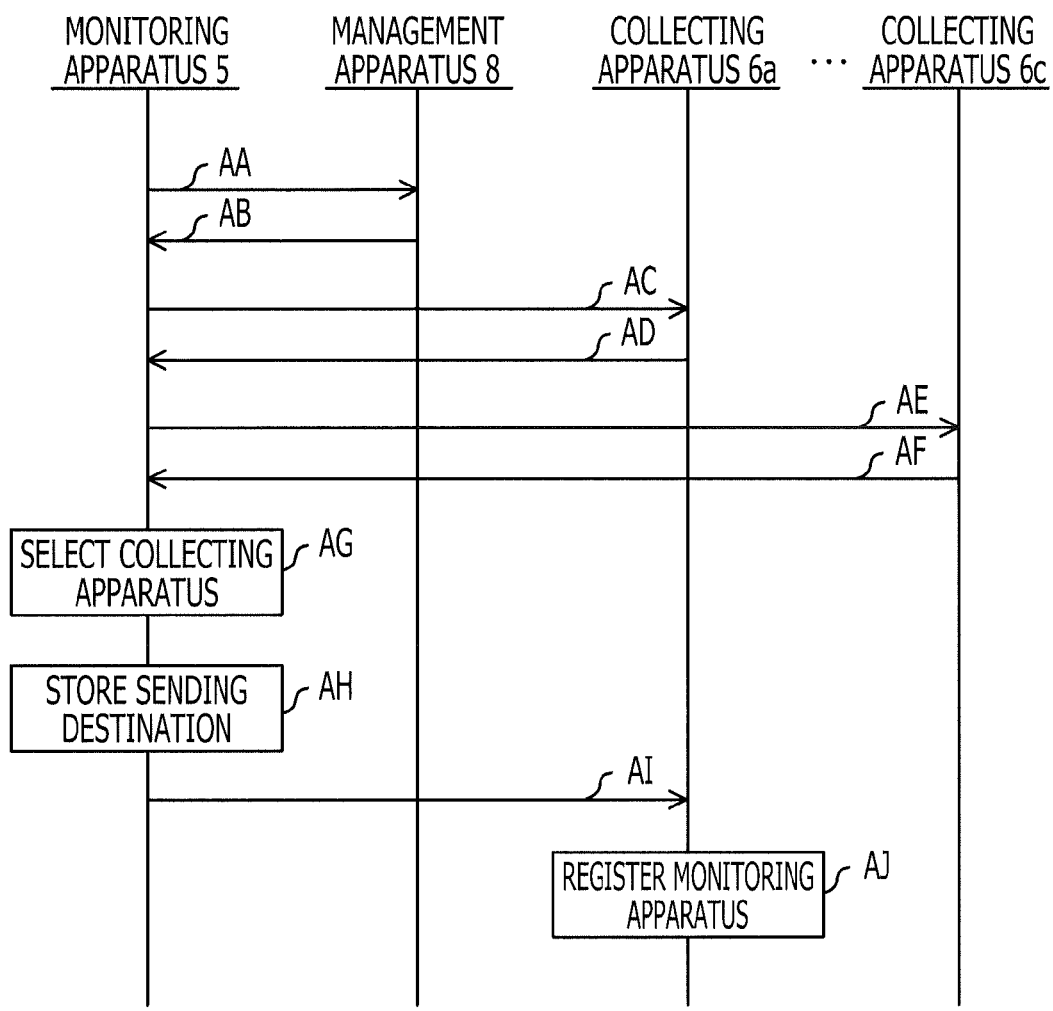
FIG. 10 is a diagram describing a first example of a process of installing a monitoring apparatus.

Now, the description will be given for a process performed by the monitoring apparatus 5, the collecting apparatuses 6, and the management apparatus 8 of the monitoring system 1 when the monitoring apparatus 5 is added to the monitoring system 1. FIG. 10 is a diagram describing a first example of the process of installing the monitoring apparatus 5.

In AA, the collecting apparatus information obtaining unit 60 of the monitoring apparatus 5 sends the collecting apparatus information request signal to the management apparatus 8.

In AB, the collecting apparatus information notifying unit 82 sends the collecting apparatus information stored in the collecting apparatus registration table 81 to the monitoring apparatus 5. The collecting apparatus information obtaining unit 60 stores the received collecting apparatus information in the collecting apparatus storage table 61.

In AC, the load information obtaining unit 62 of the monitoring apparatus 5 sends the load information request signal to the collecting apparatus 6a which is one of the collecting apparatuses 6 whose collecting apparatus information is stored in the collecting apparatus storage table 61.

In AD, the load information obtaining unit 62 receives the load information sent from the load information notifying unit 74 of the collecting apparatus 6a.

The load information obtaining unit 62 may repeat AC and AD for all or some of the collecting apparatuses 6 whose collecting apparatus information is stored in the collecting apparatus storage table 61. AE depicts the last repetition of AC, and AF depicts the last repetition of AD.

In AE, the load information obtaining unit 62 sends the load information request signal to another collecting apparatus 6c whose collecting apparatus information is stored in the collecting apparatus storage table 61.

In AF, the load information obtaining unit 62 receives the load information sent from the load information notifying unit 74 of the collecting apparatus 6c.

In AG, the collecting apparatus selecting unit 63 of the monitoring apparatus 5 selects the collecting apparatus 6 that will serve as the sending destination of the status information on the basis of the obtained load information. It is assumed here that the collecting apparatus 6a is selected.

In AH, the collecting apparatus selecting unit 63 stores, as the sending destination information 53, the collecting apparatus information of the collecting apparatus 6a in the collecting apparatus storage database 52.

In AI, the registration requesting unit 64 of the monitoring apparatus 5 sends, to the collecting apparatus 6a, the registration request signal for requesting the collecting apparatus 6a to accommodate the monitoring apparatus 5.

In AJ, the monitoring apparatus registering unit 75 of the collecting apparatus 6a registers the monitoring apparatus 5 in the monitoring apparatus database 70 as the monitoring apparatus accommodated by the collecting apparatus 6a.

According to this embodiment, when the monitoring apparatus 5 is installed in the monitoring system 1, the monitoring apparatus 5 obtains the collecting apparatus information of the collecting apparatuses 6 from an accessible collecting apparatus database 80, and sets one of the collecting apparatuses 6 as the sending destination of the status information. Also, the collecting apparatus 6 sets the monitoring apparatus information sent from the monitoring apparatus 5, as the monitoring apparatus information of the accommodated monitoring apparatus 5. Accordingly, the work for setting identification information of the monitoring apparatus 5 and the collecting apparatus 6 mutually, which has been hitherto performed, may be omitted.

According to this embodiment, the setting process is automatically performed on the basis of the collecting apparatus information of the collecting apparatuses 6 that is registered in the collecting apparatus database 80. Accordingly, setting errors are unlikely to occur and the check process for checking a connection between the monitoring apparatus 5 and the collecting apparatus 6, which has been hitherto performed, may be omitted or an amount of work spent on the check process may be largely reduced. If the identification information of the management apparatus 8 is fixed, errors may be unlikely to occur in setting of the identification information of the management apparatus 8, which is used when the collecting apparatus information is obtained. Additionally, if the fixed identification information of the management apparatus 8 is stored in the monitoring apparatus 5 beforehand, the setting process of setting the identification information of the management apparatus 8 may also be omitted.

Traditionally, when the monitoring apparatus 5 is installed, an operator measures or calculates the load or the like of the collecting apparatuses 6 beforehand, and selects a collecting apparatus 6 having less load as a destination that accommodates the monitoring apparatus 5. In contrast, according to this embodiment, the monitoring apparatus 5 selects a collecting apparatus 6 that will serve as the sending destination of the status information and, therefore, the work for selecting the destination collecting apparatus 6, which has been hitherto performed by the operator, may be omitted.

Figure 11:
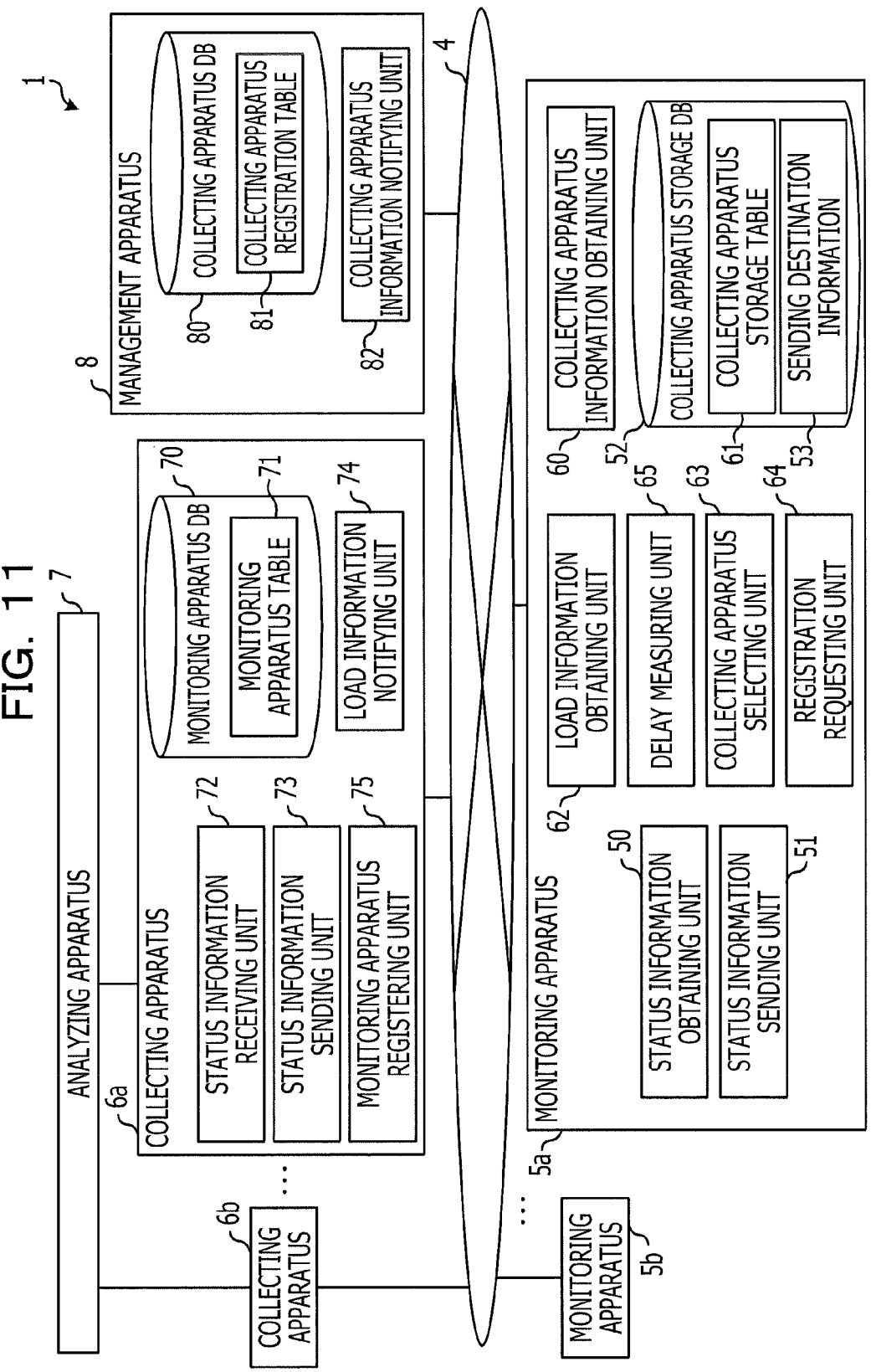
FIG. 11 is a diagram illustrating a second exemplary configuration of a monitoring system.

Now, another embodiment of the monitoring system 1 will be described. FIG. 11 is a diagram illustrating a second exemplary configuration of the monitoring system 1. Functional components similar to those illustrated in FIG. 6 are assigned the same references. These functional components assigned the same references also perform similar operations unless otherwise noted. Additionally, the functional components illustrated in FIG. 11 and functions of these functional components may be included in other embodiments. FIG. 11 mainly illustrates functions related to the following description. Thus, the monitoring apparatuses 5, the collecting apparatuses 6, the analyzing apparatus 7, and the management apparatus 8 of the monitoring system 1 may include functional components other than those illustrated in FIG. 11.

The monitoring apparatus 5 includes a delay measuring unit 65. The delay measuring unit 65 measures a delay time which is an interval between a time at which the monitoring apparatus 5 requests the collecting apparatus 6 to send a predetermined response signal and a time at which the response signal returns to the monitoring apparatus 5. The response signal may be, for example, the load information. In this case, the load information request signal sent from the load information obtaining unit 62 serves as the request for the predetermined response signal. Other signals may be requested as the response signal. For example, the response signal may be an echo reply for ping.

The collecting apparatus selecting unit 63 selects the collecting apparatus 6 that will serve as the sending destination of the status information in accordance with a condition regarding the load information and the delay time of the response signal. For example, when there are a plurality of collecting apparatuses 6 having a similar load level, the collecting apparatus selecting unit 63 may preferentially select a collecting apparatus 6 having a shorter delay time. In addition, for example, when there are a plurality of collecting apparatuses 6 having a similar load level, the collecting apparatus selecting unit 63 may select a collecting apparatus 6 on the basis of an index obtained by weighting the load with the delay time.

Figure 12:
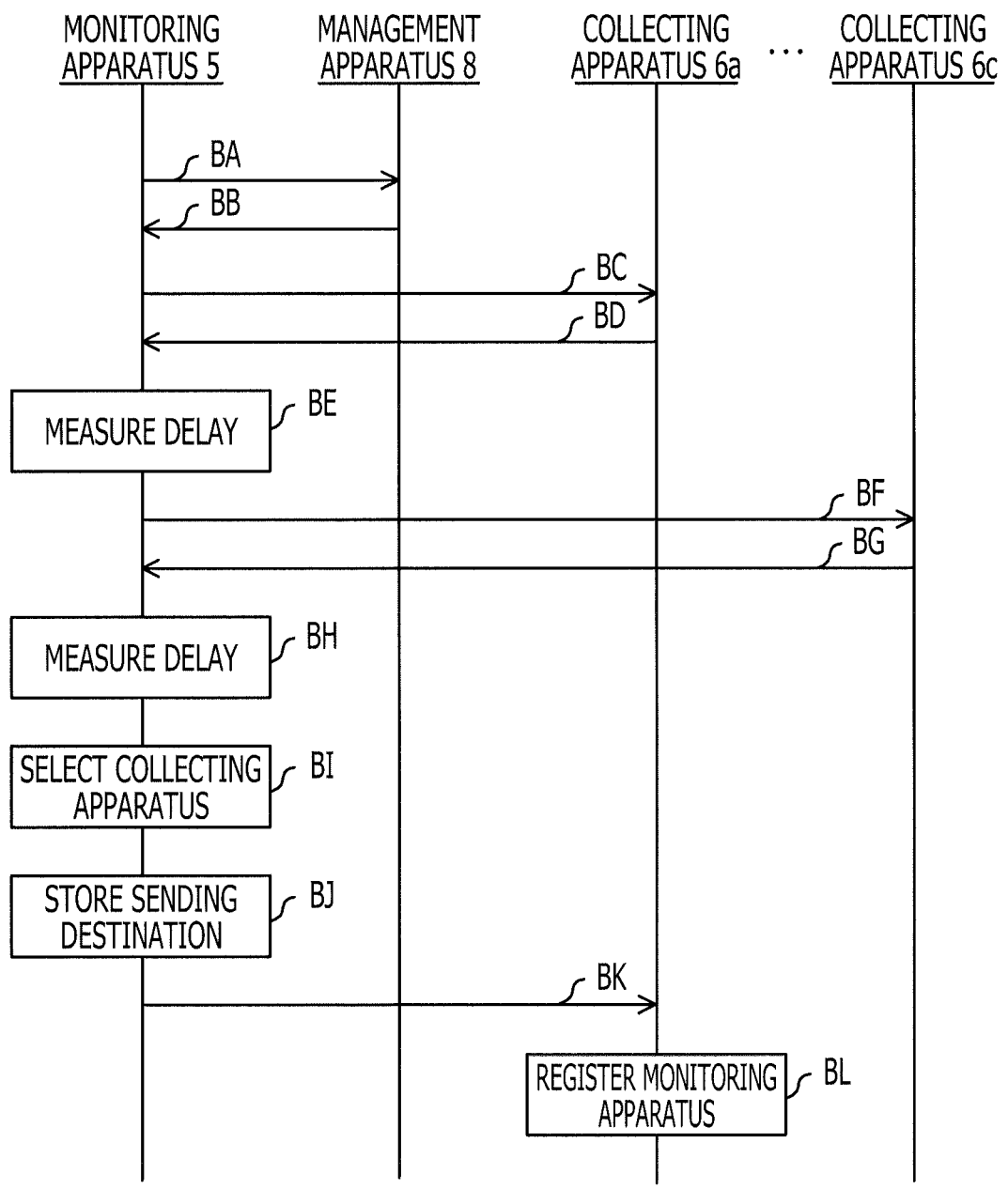
FIG. 12 is a diagram describing a second example of a process of installing a monitoring apparatus.

FIG. 12 is a diagram describing a second example of the process of installing the monitoring apparatus 5.

BA to BD, BF, and BG are similar to AA to AF illustrated in FIG. 10, respectively. Similar to the process illustrated in FIG. 10, the load information obtaining unit 62 may repeat BC and BD for all or some of the collecting apparatuses 6 whose collecting apparatus information is stored in the collecting apparatus storage table 61. BF depicts the last repetition of BC, and BG depicts the last repetition of BD.

In BE, the delay measuring unit 65 measures a delay time for the load information received in BD. The delay measuring unit 65 may repeat BE for all or some of the collecting apparatuses 6 whose collecting apparatus information is stored in the collecting apparatus storage table 61. BH depicts the last repetition of BE.

In BH, the delay measuring unit 65 measures a delay time for the load information received in BG.

In BI, the collecting apparatus selecting unit 63 selects the collecting apparatus 6 that will serve as the sending destination of the status information on the basis of the load information and the delay time of the response signal. BJ to BL are similar to AH to AJ illustrated in FIG. 10, respectively.

According to this embodiment, the loads of the collecting apparatuses 6 that accommodate the monitoring apparatuses 5 may be more smoothed out by adding the response delay time of the collecting apparatuses 6 to a condition for selecting the collecting apparatus 6.

Figure 13:
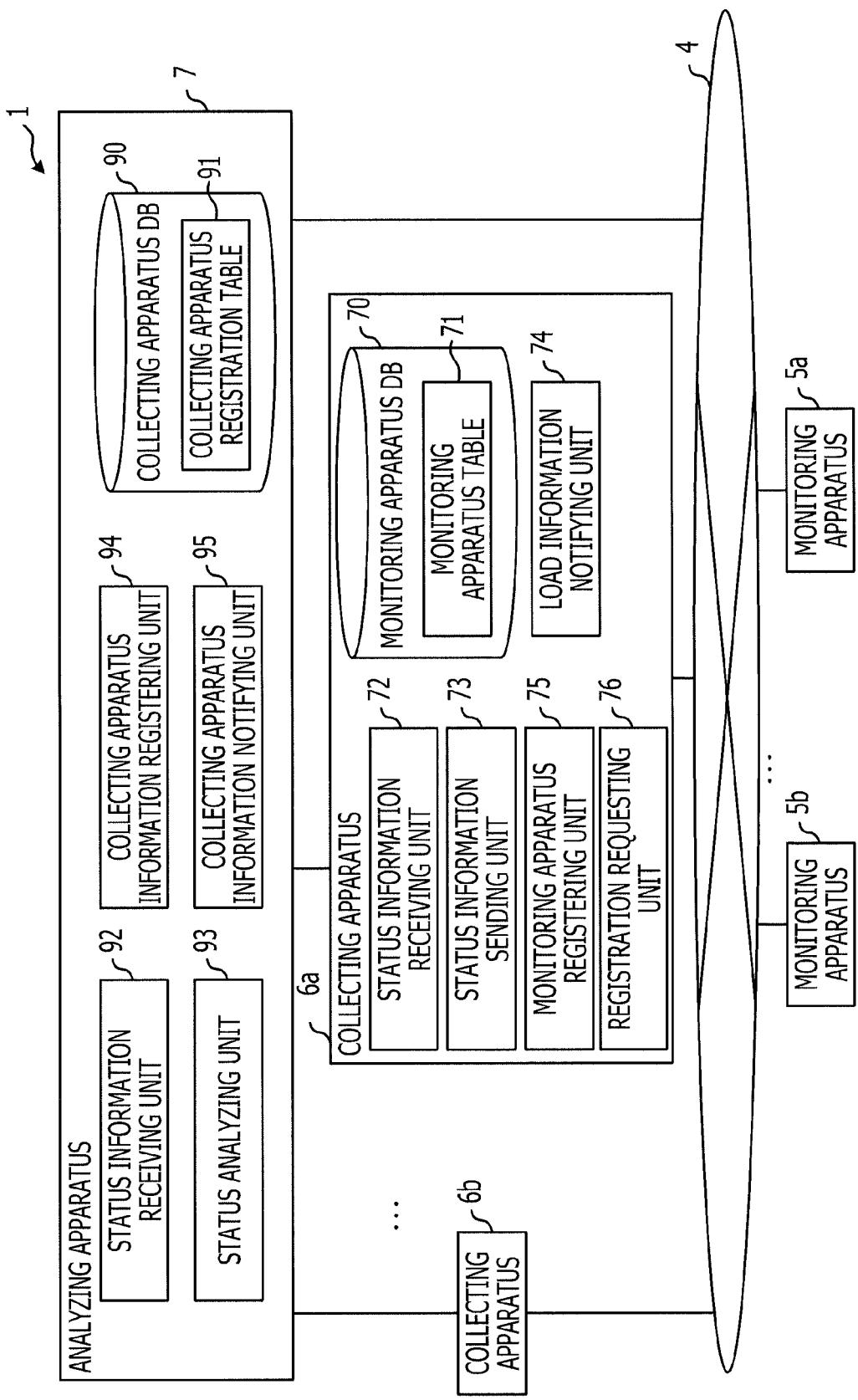
FIG. 13 is a diagram illustrating a third exemplary configuration of a monitoring system.

Now, another embodiment of the monitoring system 1 will be described. FIG. 13 is a diagram illustrating a third exemplary configuration of the monitoring system 1. Functional components similar to those illustrated in FIG. 6 are assigned the same references. These functional components assigned the same references also perform similar operations unless otherwise noted. Additionally, the functional components illustrated in FIG. 13 and functions of these functional components may be included in other embodiments.

The CPU 40 of the analyzing apparatus 7 illustrated in FIG. 5 operates in cooperation with the other hardware components of the analyzing apparatus 7 as needed, in accordance with the programs stored in the storage device 41, thereby performing information processing realized by functional components of the analyzing apparatus 7 illustrated in FIG. 13. FIG. 13 mainly illustrates functions related to the following description. Thus, the monitoring apparatuses 5, the collecting apparatuses 6, and the analyzing apparatus 7 of the monitoring system 1 may include functional components other than those illustrated in FIG. 13.

The analyzing apparatus 7 includes a collecting apparatus database 90, a status information receiving unit 92, a status analyzing unit 93, a collecting apparatus information registering unit 94, and a collecting apparatus information notifying unit 95. In addition, the collecting apparatus 6 includes a registration requesting unit 76.

The collecting apparatus database 90 of the analyzing apparatus 7 stores a collecting apparatus registration table 91 which stores information on the collecting apparatuses 6 that collect status information in the monitoring system 1. The collecting apparatus database 90 may be stored in the storage device 41 of the analyzing apparatus 7 illustrated in FIG. 5. The collecting apparatus registration table 91 may be the same as the collecting apparatus registration table 81 illustrated in FIG. 9.

The status information receiving unit 92 receives the status information sent from the collecting apparatuses 6. The analyzing apparatus 7 may send, to the collecting apparatuses 6 whose collecting apparatus information is stored in the collecting apparatus registration table 91, various instructions or information used for collecting and sending the status information. The status analyzing unit 93 detects the quality of the communication network 2 and a failure caused in the communication network 2 by analyzing the collected status information.

The registration requesting unit 76 of the collecting apparatus 6 sends a registration request signal for requesting the analyzing apparatus 7 to register this collecting apparatus 6 as a collecting apparatus that sends collected status information to the analyzing apparatus 7. The registration request signal may include the collecting apparatus information of the collecting apparatus 6.

The collecting apparatus information registering unit 94 of the analyzing apparatus 7 receives the registration request signal sent from the registration requesting unit 76 of the collecting apparatus 6. Upon reception of the registration request signal, the collecting apparatus information registering unit 94 registers the collecting apparatus 6 that has sent the registration request signal on the collecting apparatus database 90, as a collecting apparatus 6 that sends status information to the analyzing apparatus 7. That is, the collecting apparatus information registering unit 94 stores the collecting apparatus information of the collecting apparatus 6 that has sent the registration request signal in the collecting apparatus registration table 91.

In this embodiment, the collecting apparatus information obtaining unit 60 of the monitoring apparatus 5 obtains the collecting apparatus information of the collecting apparatuses 6 from the analyzing apparatus 7. The collecting apparatus information notifying unit 95 of the analyzing apparatus 7 receives the collecting apparatus information request signal sent from the collecting apparatus information obtaining unit 60 of the monitoring apparatus 5. Upon reception of the collecting apparatus information request signal, the collecting apparatus information notifying unit 95 sends, to the monitoring apparatus 5, the collecting apparatus information of all or some of the collecting apparatuses 6 that is stored in the collecting apparatus registration table 91.

According to this embodiment, the collecting apparatus information is obtained from the collecting apparatus database 90 managed by the analyzing apparatus 7 in order to manage the collecting apparatuses 6 that collect status information. The obtained collecting apparatus information is then provided to the monitoring apparatus 5. Thus, according to this embodiment, the work for separately installing and performing maintenance of a collecting apparatus database in order to provide the collecting apparatus information to the monitoring apparatus 5 may be omitted.

Now, another embodiment of the monitoring system 1 will be described. In the work for installing the monitoring apparatus 5, which has been hitherto performed, information on the monitoring apparatus 5 accommodated by the collecting apparatus 6 is set in the collecting apparatus 6 by an operator. Accordingly, the possibility that an apparatus which the operator does not intend to connect to the collecting apparatus 6 is set as the monitoring apparatus 5 accommodated by the collecting apparatus 6 is low unless the operator makes a mistake.

In the above-described embodiments, the collecting apparatus 6 registers the accommodated monitoring apparatus 5 in accordance with the registration request signal sent from the monitoring apparatus 5. Accordingly, an apparatus which the operator does not intend to connect to the collecting apparatus 6 may possibly be set as the monitoring apparatus 5 accommodated by the collecting apparatus 6. In the embodiment described below, the collecting apparatus 6 performs authentication of the monitoring apparatus 5, whereby the possibility that an apparatus which the operator does not intend to connect to the collecting apparatus 6 is set as the monitoring apparatus 5 accommodated by the collecting apparatus 6 is reduced.

Figure 14:
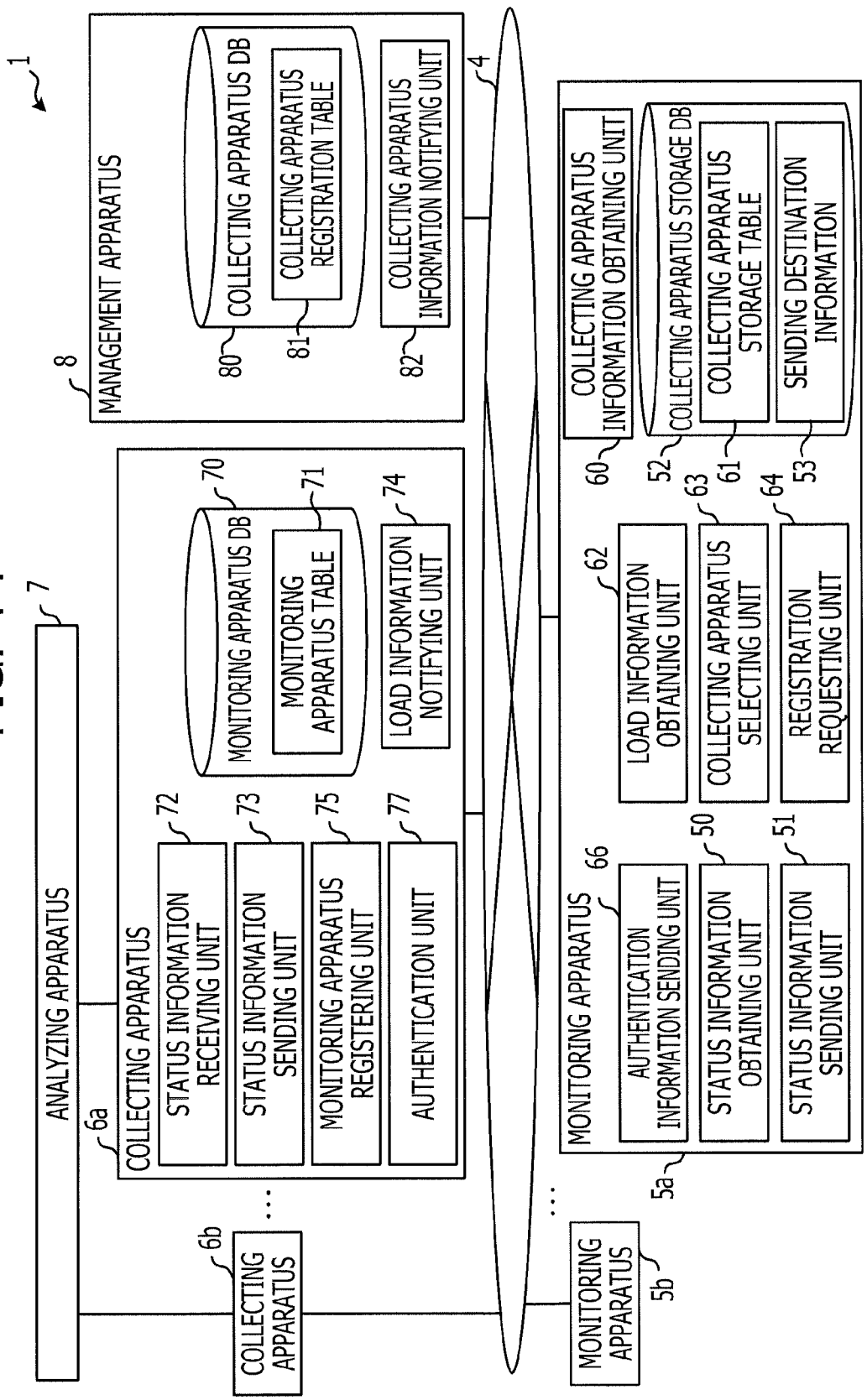
FIG. 14 is a diagram illustrating a fourth exemplary configuration of a monitoring system.

FIG. 14 is a diagram illustrating a fourth exemplary configuration of the monitoring system 1. Functional components similar to those illustrated in FIG. 6 are assigned the same references. These functional components assigned the same references also perform similar operations unless otherwise noted. Additionally, the functional components illustrated in FIG. 14 and functions of these functional components may be included in other embodiments. FIG. 14 mainly illustrates functions related to the following description. Thus, the monitoring apparatuses 5, the collecting apparatuses 6, the analyzing apparatus 7, and the management apparatus 8 of the monitoring system 1 may include functional components other than those illustrated in FIG. 14.

The monitoring apparatus 5 includes an authentication information sending unit 66. The collecting apparatus 6 includes an authentication unit 77. The authentication information sending unit 66 of the monitoring apparatus 5 sends authentication information to the collecting apparatus 6 when the registration requesting unit 64 sends, to the collecting apparatus 6, the registration request signal for requesting the collecting apparatus 6 to accommodate the monitoring apparatus 5.

The authentication unit 77 of the collecting apparatus 6 receives the authentication information, and performs an authentication process based on the received authentication information on the monitoring apparatus 5 to determine whether or not to permit the connection of the monitoring apparatus 5 to the collecting apparatus 6. When the connection to the collecting apparatus 6 is permitted in the authentication process, the monitoring apparatus registering unit 75 receives the registration request signal, and registers the monitoring apparatus 5 in the monitoring apparatus database 70.

FIG. 15 is a diagram describing a third example of the process of installing the monitoring apparatus 5.

CA to CH are similar to AA to AH illustrated in FIG. 10, respectively.

In CI, before the registration requesting unit 64 of the monitoring apparatus 5 sends the registration request signal, the authentication information sending unit 66 sends the authentication information to the collecting apparatus 6*a*.

In CJ, the authentication unit 77 of the collecting apparatus 6*a* performs the authentication process on the monitoring apparatus 5.

In CK, if the authentication succeeds, the authentication unit 77 sends a permission signal to the monitoring apparatus 5.

In CL, the registration requesting unit 64 of the monitoring apparatus 5 that has received the permission signal sends the registration request signal to the collecting apparatus 6*a*.

In CM, the monitoring apparatus registering unit 75 of the collecting apparatus 6*a* registers the monitoring apparatus 5 in the monitoring apparatus database 70.

According to this embodiment, the possibility that an apparatus which the operator does not intend to connect to the collecting apparatus 6 is set in the collecting apparatus 6 as the monitoring apparatus 5 accommodated by the collecting apparatus 6 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus comprising:
   a storage to store collecting apparatus information for identifying one of a plurality of collecting apparatuses collecting status information of a network; and
   a processor to
   acquire status information of the network from a network apparatus connected to the network,
   acquire, from a database, collecting apparatus information for identifying each of the plurality of collecting apparatuses,
   acquire, based on the acquired collecting apparatus information, load information indicating a load on each of the plurality of collecting apparatuses,
   select, based on the acquired load information, one collecting apparatus among the plurality of collecting apparatuses to be a sending destination of the acquired status information, to which the monitoring apparatus transmits the acquired status information, store collecting apparatus information for identifying the selected collecting apparatus in the storage, and notify the selected collecting apparatus of monitoring apparatus information for identifying the monitoring apparatus.

2. The monitoring apparatus according to claim 1, wherein the load information indicates a total number of monitoring apparatuses from which a collecting apparatus receives status information.

3. The monitoring apparatus according to claim 1, wherein
the processor further requests the plurality of collecting apparatuses to respond, and the processor selects, based on delay times of responses from the plurality of collecting apparatuses, the one collecting apparatus when the load on each of the plurality of collecting apparatuses indicated by the load information is within a predetermined range.

4. A monitoring system comprising:
a plurality of collecting apparatuses to collect status information of a network, each of the plurality of collecting apparatuses including:
a first storage to store monitoring apparatus information for identifying source apparatuses transmitting the status information, and
a first processor to store the monitoring apparatus information received from the source apparatuses in the first storage; and
a monitoring apparatus including
a second storage to store collecting apparatus information for identifying one of the plurality of collecting apparatuses, and
a second processor to
acquire status information of the network from a network apparatus connected to the network,
acquire, from a database, collecting apparatus information for identifying each of the plurality of collecting apparatuses,
acquire, based on the acquired collecting apparatus information, load information indicating a load on each of the plurality of collecting apparatuses,
select, based on the acquired load information, one collecting apparatus among the plurality of collecting apparatuses to be a sending destination of the acquired status information, to which the monitoring apparatus transmits the acquired status information,
store collecting apparatus information for identifying the selected collecting apparatus in the second storage, and
notify the selected collecting apparatus of monitoring apparatus information for identifying the monitoring apparatus, as monitoring apparatus information of one of the source apparatuses.

5. The monitoring system according to claim 4, further comprising:
a management apparatus including:
a third storage to store the database, and
a third processor to
receive, from each of the plurality of collecting apparatuses, collecting apparatus information of each of the plurality of collecting apparatuses,
register the received collecting apparatus information on the database, and
notify the monitoring apparatus of the collecting apparatus information registered on the database.

6. The monitoring system according to claim 4, wherein
the second processor further transmits authentication information to the selected collecting apparatus,
the first processor of the selected collecting apparatus further performs authentication based on the authentication information, and
the first processor of the selected collecting apparatus stores the notified monitoring apparatus information in the first storage when the authentication succeeds.

7. An information setting method executed by a monitoring apparatus including a storage and a processor, the information setting method comprising:
acquiring status information of a network from a network apparatus connected to the network;
acquiring, from a database, collecting apparatus information for identifying each of a plurality of collecting apparatuses collecting status information of the network;
acquiring, based on the acquired collecting apparatus information, load information indicating a load on each of the plurality of collecting apparatuses;
selecting, based on the acquired load information, one collecting apparatus among the plurality of collecting apparatuses to be a sending destination of the acquired status information, to which the monitoring apparatus transmits the acquired status information;
storing, by the processor, collecting apparatus information for identifying the selected collecting apparatus in the storage; and
notifying the selected collecting apparatus of monitoring apparatus information for identifying the monitoring apparatus.

8. A non-transitory computer-readable medium storing a program that causes a computer to execute a procedure comprising:
acquiring status information of a network from a network apparatus connected to the network;
acquiring, from a database, collecting apparatus information for identifying each of a plurality of collecting apparatuses collecting status information of the network;
acquiring, based on the acquired collecting apparatus information, load information indicating a load on each of the plurality of collecting apparatuses;
selecting, based on the acquired load information, one collecting apparatus among the plurality of collecting apparatuses to be a sending destination of the acquired status information, to which the computer transmits the acquired status information;
storing collecting apparatus information for identifying the selected collecting apparatus in a storage; and
notifying the selected collecting apparatus of monitoring apparatus information for identifying the computer.

* * * * *